(12) United States Patent
Oka et al.

(10) Patent No.: US 8,849,305 B2
(45) Date of Patent: Sep. 30, 2014

(54) SYSTEM AND METHOD FOR IMPROVING LOCATION ESTIMATES OF CO-LOCATED SECTORED CELL SITES FOR LOCATION SERVICES

(71) Applicant: Research In Motion Limited, Waterloo (CA)

(72) Inventors: Anand Ravindra Oka, Waterloo (CA); Christopher Harris Snow, Kitchener (CA); Sean Bartholomew Simmons, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 58 days.

(21) Appl. No.: 13/628,571

(22) Filed: Sep. 27, 2012

(65) Prior Publication Data
US 2014/0087753 A1 Mar. 27, 2014

(51) Int. Cl.
*H04W 24/00* (2009.01)
*H04W 4/02* (2009.01)

(52) U.S. Cl.
CPC .................................. *H04W 4/021* (2013.01)
USPC .................. 455/456.1; 455/456.5; 455/456.6; 455/456.3; 455/404.2; 455/404.1

(58) Field of Classification Search
CPC ...... H04W 4/021; H04W 4/023; H04W 4/025
USPC .......... 455/456.1, 456.5, 456.6, 456.3, 404.2, 455/404.1
See application file for complete search history.

(56) References Cited

U.S. PATENT DOCUMENTS

| | | | |
|---|---|---|---|
| 7,570,615 B2* | 8/2009 | Bolin et al. ................... 370/329 |
| 2005/0113117 A1 | 5/2005 | Bolin et al. | |
| 2010/0099401 A1* | 4/2010 | Bishop ...................... 455/422.1 |
| 2011/0086609 A1* | 4/2011 | Buehler et al. ............. 455/404.2 |
| 2011/0207455 A1* | 8/2011 | Lee et al. ...................... 455/434 |
| 2012/0309341 A1* | 12/2012 | Ward ......................... 455/404.2 |
| 2013/0023280 A1* | 1/2013 | Paddon et al. ............. 455/456.1 |
| 2013/0337847 A1* | 12/2013 | Sridhara et al. ............ 455/456.6 |
| 2014/0087763 A1* | 3/2014 | Gao et al. ................... 455/456.3 |

OTHER PUBLICATIONS

Extended European Search Report dated Feb. 11, 2013 corresponding to European Patent Application No. 12186453.2.

* cited by examiner

*Primary Examiner* — Khai M Nguyen
(74) *Attorney, Agent, or Firm* — Gowling Lafleur Henderson LLP

(57) ABSTRACT

Improved location estimates for transceivers is described. The location estimate of transceivers can be improved for sector transceivers that are co-located at a sectored cell site. The location estimate for each individual co-located sector transceiver can be updated as a centroid of all of the co-located sector transceivers. The location information of the transceivers can be used to provide network location estimation to mobile devices which do not have accurate positioning estimates.

19 Claims, 15 Drawing Sheets

| Observation data | | |
|---|---|---|
| TID | Latitude | Longitude |
| 123.1 | 43.475883° | -80.542907° |
| 123.2 | 43.475381° | -80.544317° |
| 123.3 | 43.474598° | -80.542778° |
| 456a | 40.794909° | -85.583496° |
| 9876 | 38.631306° | -123.175964° |
| 558 | 36.190387° | -5.427933° |
| 645 | 46.202806° | -63.76158° |

Figure 11A

| Location data | | | |
|---|---|---|---|
| TID | Latitude | Longitude | vTID |
| 123.1 | 43.475883° | -80.542907° | 1 |
| 123.2 | 43.475381° | -80.544317° | 1 |
| 123.3 | 43.474598° | -80.542778° | 1 |
| 456a | 40.794909° | -85.583496° | - |
| 9876 | 38.631306° | -123.175964° | - |
| 558 | 36.190387° | -5.427933° | - |
| 645 | 46.202806° | -63.76158° | - |

Figure 11B

| Location data | | | |
|---|---|---|---|
| TID | Latitude | Longitude | vTID |
| 123.1 | 43.47523° | -80.543156° | 1 |
| 123.2 | 43.47523° | -80.543156° | 1 |
| 123.3 | 43.47523° | -80.543156° | 1 |
| 456a | 40.794909° | -85.583496° | - |
| 9876 | 38.631306° | -123.175964° | - |
| 558 | 36.190387° | -5.427933° | - |
| 645 | 46.202806° | -63.76158° | - |

Figure 11C

SYSTEM AND METHOD FOR IMPROVING LOCATION ESTIMATES OF CO-LOCATED SECTORED CELL SITES FOR LOCATION SERVICES

TECHNICAL FIELD

The current disclosure relates to mobile device location services and in particular to improving location estimation of co-located transceivers of sectored cell sites for location services.

BACKGROUND

Mobile devices, such as smartphones, tablets and laptops location services enable location based applications or services to be provided on the devices. These services require that the mobile device determine their current location, or an estimate of the location using location technology such as a global positioning system (GPS) receiver. However a GPS receiver or signal may not always be available, or its accuracy too low due to the particular radio frequency environment, and an accurate location for the mobile device may be able to be determined.

It is possible to estimate a location of a mobile device based on a radio scene captured by the mobile device, however an accurate location of the associated transceivers is required to provide location estimate. The radio scene may comprise a plurality of cell identifiers (IDs) and associated received signal strength indicator (RSSI) value from cellular transceivers the mobile device is receiving signals from. If the locations of the transceivers are known, the location of the mobile device can be estimated using trilateration, or more generally n-lateration.

FIG. 1 depicts the use of trilateration for determining a location of a mobile device. In FIG. 1, it is assumed that the person 102 has a mobile device. The mobile device may communicate with numerous cell sites 104a, 104b, 104c having transceivers (referred to collectively as cell sites 104). If the position of the cell sites 104 are known, and a distance 106, 106b, 106c from each of the cell sites 104 to the person 102 is known, it is possible to determine the location of the person using trilateration, which is the case of n-lateration for n=3. The signal strength of signals 108a, 108b, 108c received at the user's mobile device from the cell sites 104 can be used to provide an estimate of the distance the user is from the transceivers of the respective cell sites 104. The mobile device may provide a current radio scene to a location service that can provide the required location information of the cell site. The location service can perform the trilateration and return the estimate of the mobile device's location back to the mobile device, which can then use the estimated location as desired.

FIG. 2 depicts an illustrative representation of determining a location of a cell site. The cell site 202 communicates with a plurality of users 204a,204b, 204c, 204d, 204e, 204f (referred to collectively as users 204), or more precisely the mobile devices of the users 204, that are within a transmission radius 206 of the transceiver of the cell site 202. If the locations of the users 204 are known as well as the distances 208a, 208b, 208c, 208d, 208e, 208f from the users 204 to the cell site 202, the location of the cell site 202 can be determined. Additionally or alternatively, if a large number of users provide their location information, the location of the cell site can be estimated as a centroid of the provided mobile device locations.

While the above technique for determining a cell site's location as a centroid of mobile device positions works well if the users providing their location information are evenly distributed about the transceiver of cell site, the technique will provide a location estimate with a larger error if the users are not evenly located about the transceiver of the cell site, as may be the case for co-located transceivers of sectored cell sites.

As described above, in order to provide a location service when GPS information is not available or is inaccurate from the mobile device, the location of cell sites must be known to use network based location techniques. Although the wireless carriers, or infrastructure service providers, that operate the wireless network will know the location of the cell sites to a high degree of accuracy and can use network based location techniques to determine a location of a mobile device, this information is often not available to third parties or applications that may wish to provide location services to mobile devices. As such, it is necessary to be able to accurately determine the location of cell sites in a network in order to provide location services without relying on service provider location information.

Therefore there is a need for a system and method for improved location estimates of co-located sectored cell sites.

BRIEF DESCRIPTION OF THE DRAWINGS

Further features and advantages of the present disclosure will become apparent from the following detailed description, taken in combination with the appended drawings, in which:

FIG. 11A depicts illustrative observation data;

FIG. 11B depicts illustrative location data;

FIG. 11C depicts illustrative location data with co-located sector transceivers identified;

DETAILED DESCRIPTION

Figure 1:
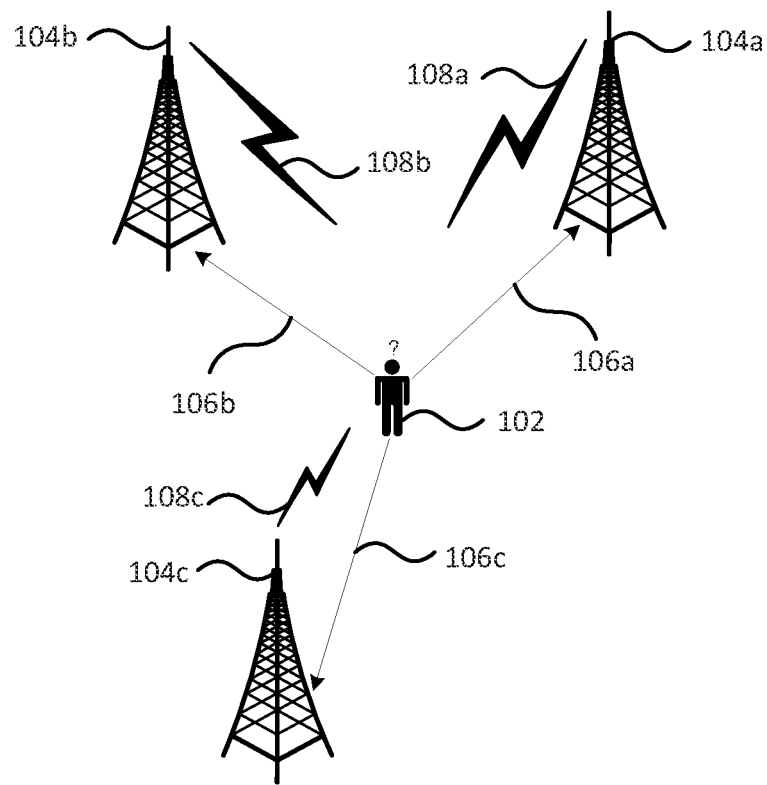
FIG. 1 depicts the use of trilateration for determining a location of a mobile device.
Figure 2:
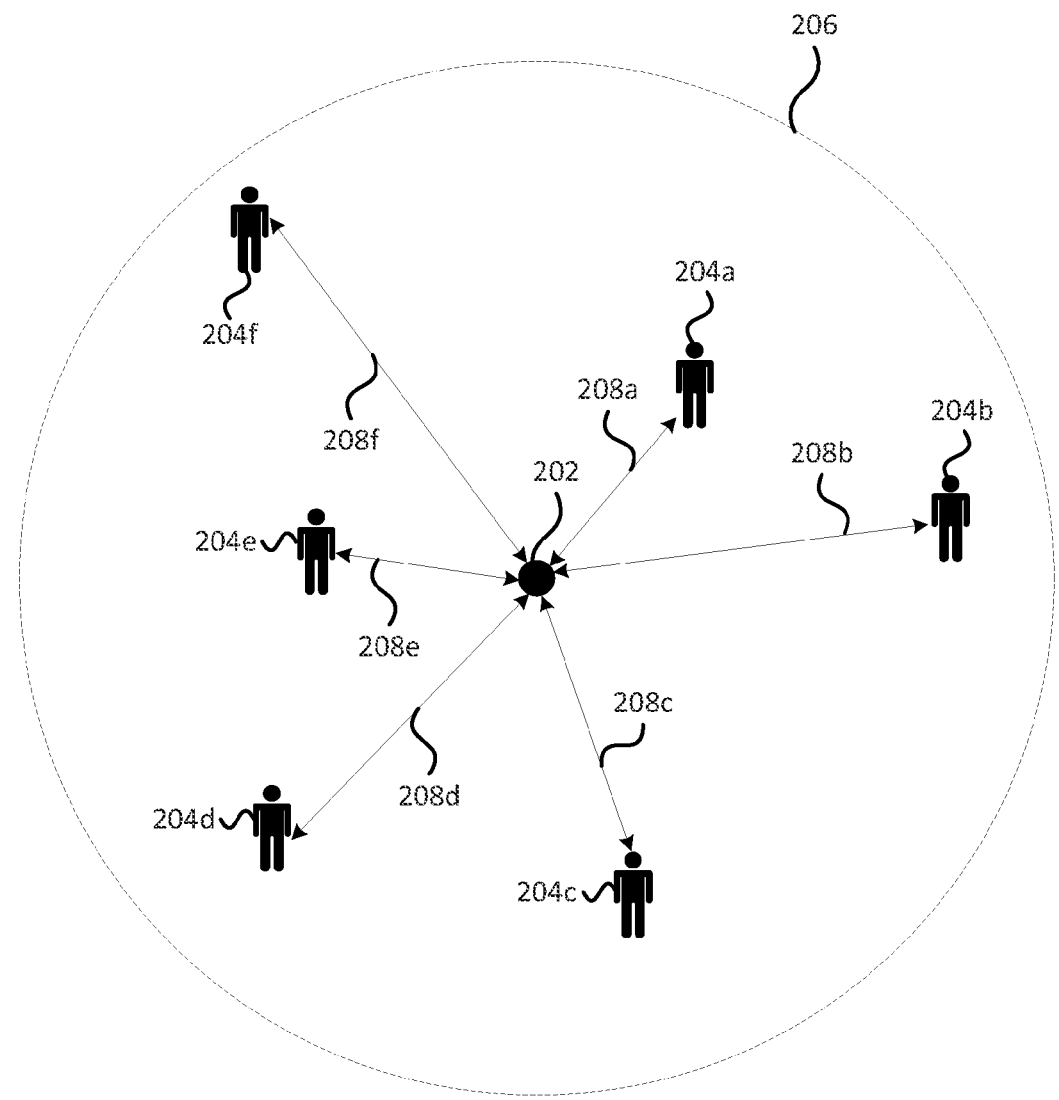
FIG. 2 depicts a representation of determining a location of a transceiver.

In accordance with the present disclosure, there is provided a method of improving a location estimate of a transceivers co-located at a sectored cell site, the method comprising: identifying a plurality of transceivers that are co-located at the sectored cell site; determining a location of a virtual transceiver as an average of respective location estimates of the plurality of identified transceivers; and assigning the determined location of the virtual transceiver to each of the transceivers determined to be co-located.

In accordance with the present disclosure, there is further provided an apparatus for estimating a transceiver's location comprising: at least one processing unit for executing instructions; and at least one memory unit for executing instructions, the instructions when executed by the at least one processing unit configuring the apparatus to perform a method of improving a location estimate of transceivers co-located at a sectored cell site, the executing instructions configuring the apparatus to: identify a plurality of transceivers that are co-located at the sectored cell site; determine a location of a virtual transceiver as an average of respective location estimates of the plurality of identified transceivers; and assign the determined location of the virtual transceiver to each of the transceivers determined to be co-located.

In accordance with the present disclosure, there is further provided a non-transitory computer readable memory storing computer executable instructions thereon that when executed by a processor perform a method of improving a location estimate of transceivers co-located at a sectored cell site, the method comprising: identifying a plurality of transceivers that are co-located at the sectored cell site; determining a location of a virtual transceiver as an average of respective location estimates of the plurality of identified transceivers; and assigning the determined location of the virtual transceiver to each of the transceivers determined to be co-located.

Although the following discloses example methods and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the scope of the teachings provided herein is not considered to be limited to the specific description of the embodiments provided herein. Embodiments are described below, by way of example only, with reference to FIGS. 1 to 13.

Figure 3:
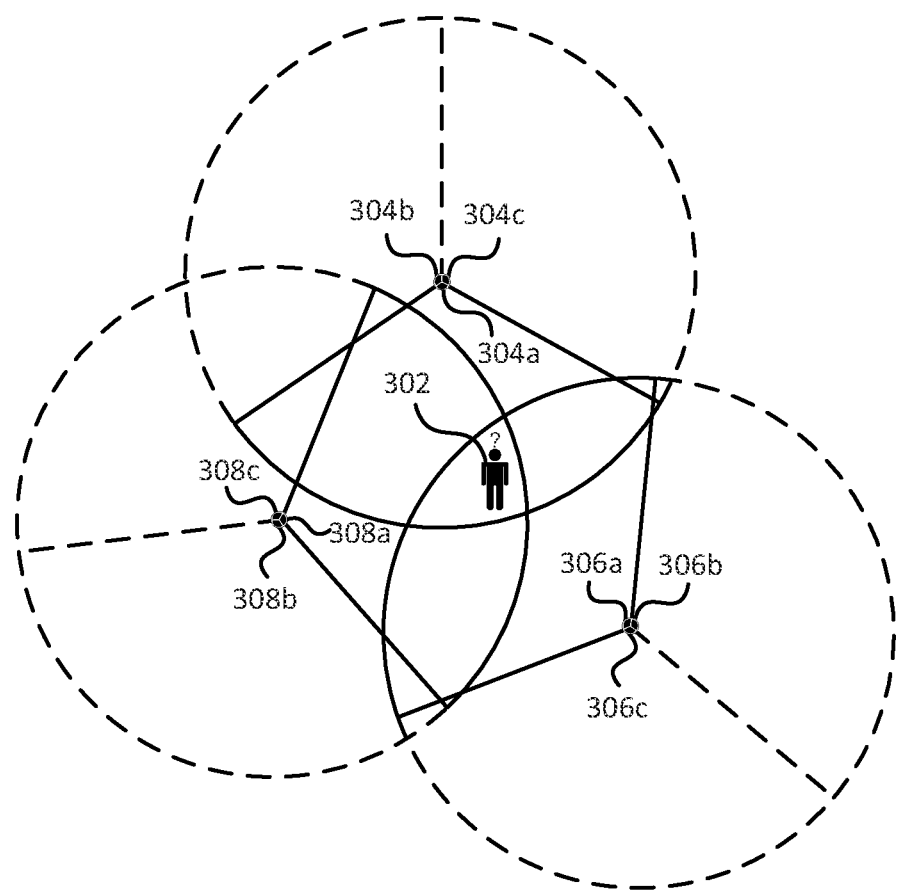
FIG. 3 depicts the use of trilateration for determining a location of a mobile device with sector transceivers co-located at sectored cell sites.

FIG. 3 depicts the use of trilateration for determining a location of a mobile device with sectored cell sites. Cell sites in a cellular or mobile network may be omni-directional, as depicted above in FIGS. 1 and 2. Omni-directional cell sites have a single transceiver and antenna (referred to collectively as a transceiver for simplicity) that radiates a radio frequency (RF) signal in all directions equally. Cell sites may also be sectored. Sectored cell sites have multiple sectors that combine to provide the desired coverage. Sectored cell sites may comprise multiple transceivers each having an associated sector antenna that radiates an RF signal in a preferential direction. The transceiver and associated sector antenna may be referred to as a sector transceiver. A sector transceiver may include a directional antenna coupled to a base station transceiver. The base station transceiver may be associated with one or more directional antennas that are co-located at the sectored cell site. The number of sector transceivers in a sectored cell site may vary based upon the degree of sectorization; for example three or six sectors are common but this number may vary based upon the beam width of each sector.

FIG. 3 depicts three sectored cell sites. A first cell site has sectors provided by sector transceivers 304*a*, 304*b*, and 304*c* (referred to collectively as transceivers 304). A second cell site has sectors provided by sector transceivers 306*a*, 306*b*, and 306*c* (referred to collectively as transceivers 306. A third cell site is has sectors provided by sector transceivers 308*a*, 308*b*, and 308*c* (referred to collectively as transceivers 308). As depicted, each of the transceivers 304, 306, 308 is represented as covering a 120 degree sector beam width, although the beam width of each sector may individually vary based upon the coverage requirements. Each of the individual transceivers 304, 306, 308 of the sectored cell sites is assigned a unique identifier. Although there is no requirement for sector transceivers that are co-located at a sectored cell site to be labelled with consecutive IDs, it is common for co-sector transceivers of a sectored cell site to have a portion of the unique ID common to each co-located transceiver, and another portion that uniquely identifies the individual transceivers within the cell site. The particular format of the IDs of the co-located transceivers may vary based on various factors, including the communication standard of the transceivers, the telecommunication company that maintains the transceivers, the geographic location of the transceivers, the date the transceivers were installed, the network type, as well as other possible factors.

As an example of unique identifiers, a transceiver may be uniquely identified by a Cell Global Identification (CGI) number. A CGI is composed of a number associated with the country, referred to as the mobile country code (MCC), a number associated with the carrier or network provider in the country, referred to as the mobile network code (MNC), a number associated with the area of the network provided by the carrier, referred to as the location area code (LAC) and a number identifying the transceiver within the location area, referred to as the cell ID. It will be appreciated that although a transmitter may be uniquely identified by a CGI number, it is not necessary for each transceiver to transmit the full CGI number in order for a mobile device to be able to uniquely identify the transceiver.

Regardless of the specific requirements of uniquely identifying transceivers, there is often a transceiver labelling format that is used, or attempted to be used, in labelling the unique transceiver IDs of the sectored cell site. For example, the transceiver 304*a* may have an ID of 123 1, transceiver 304*b* may have an ID of 123 2, and transceiver 304*c* may have an ID of 123 3.

Determining a location of a user 302 from the transceivers 304, 306, 308 of sectored cell sites is substantially similar to determining the location from omni-directional cell site transceivers, and in fact, the mobile device may not recognize that the transceivers are sectorized. The user 102 may capture radio scene information comprising the RSSI values and transceiver IDs and send the radio scene information to a location service that can retrieve the location of the transceivers and determine an estimate of the location of the mobile device. When the locations of the identified transceivers are known, the location service can provide a relatively accurate location estimate of the mobile device. However without accurate location information of the transceivers in the network, any location estimate based on the information will not be accurate.

Figure 4:
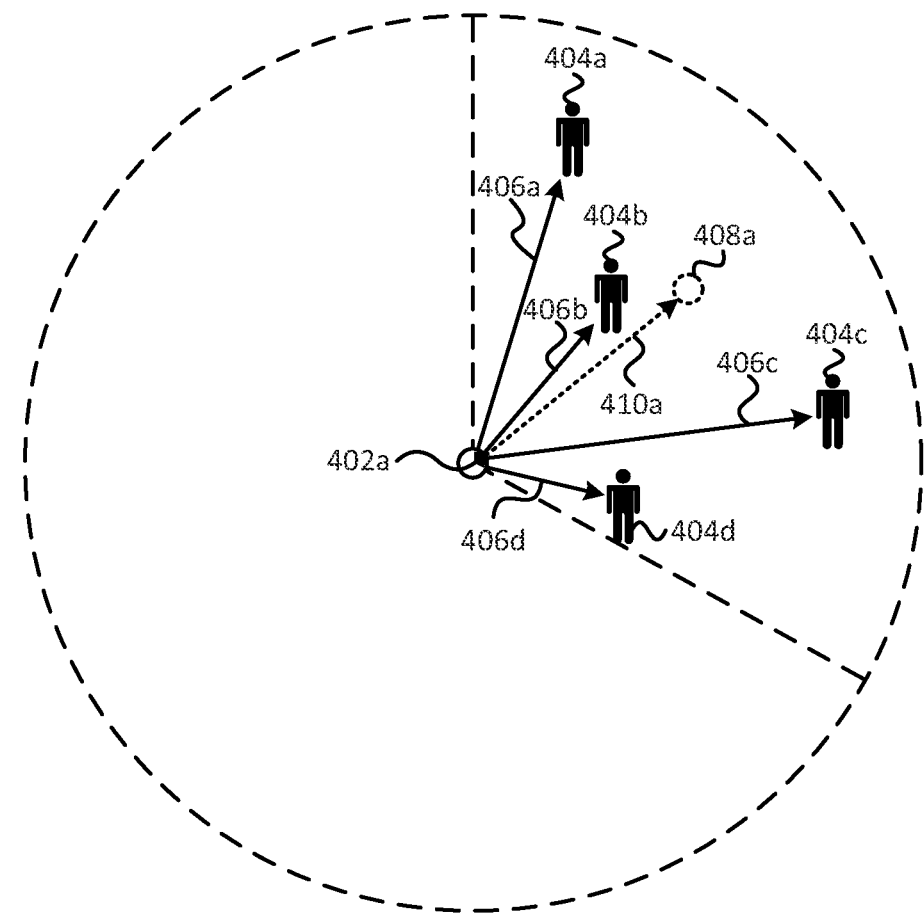
FIG. 4 depicts determining a location estimate of a sector transceiver of a sectored cell site.

FIG. 4 depicts determining a location estimate of a sector transceiver of a sectored cell site. The location method is substantially similar to that of determining a location estimate of an omni-directional transceiver described above with regards to FIG. 2. A single sector transceiver 402a of a sectored cell site is depicted. A plurality of users 4004a, 404b, 404c, 404d that know their respective locations and distances 406a, 406b, 406c, 406d, which may be based on RSSI values, from the sector transceiver can provide the information to a location service. The location service may estimate the location of the sector transceiver 402a as a centroid of the locations of the users. However, since the transceiver 402a is sectored, the majority of the locations of the users 404 will be from a preferential direction, and as such the estimated location, depicted by circle 408a will have an associated error 410a, which will be relatively large.

Although the location of the sector transceiver 402a is described as being estimated as a centroid, it is contemplated that other methods of estimating transceiver locations from user reports are also possible. For example, the estimate may be based on finding a good convex hull of the measurements. Irrespective of the details of how the estimate is determined, the result will suffer from a bias into the cone of the sector, because of the asymmetric observation of the sector transceiver.

The antenna gain pattern of sector transceivers at a sectored cell site is highly peaked towards the respective sector. Hence even if users are physically present all around a sectored cell site, they will see the sector that they happen to be in. That is, the observation of transceivers of the sectored cell site will predominantly come only from the particular sector. This means that the centroid estimates of sector transceiver locations will be heavily biased into the cone of the respective sectors. Since the locations provided by the users are not evenly distributed around the sectorized transceiver, an estimate of the cell site location for the sector transceiver will have a relatively large error, in comparison to a transceiver with users evenly distributed about it. This error in cell site location can decrease the accuracy of a location of a mobile device estimated using the sectored cell site location estimates.

Figure 5:
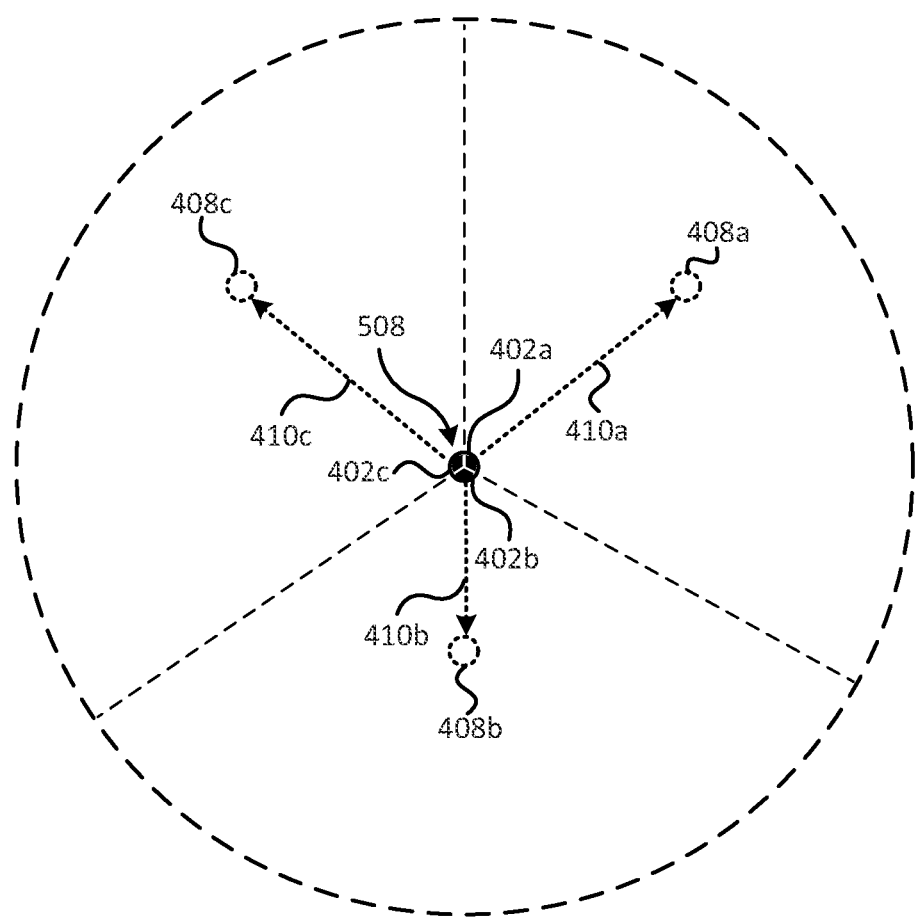
FIG. 5 depicts determining a location for a plurality of sector transceivers in a sectored cell site.

FIG. 5 depicts determining a location for a plurality of sector transceivers that are co-located at a sectored cell site. In comparison to FIG. 4, additional sector transceivers 402b, 402c are depicted. It is assumed that the sector transceivers are co-located, for example on the same sectored cell site. Each sector transceiver of the cell site has an associated estimated location 408b, 408c and respective error 410b, 410c. As described in further detail below, the location estimate for each transceiver of a sectored cell site can be improved by combining the location estimates of the individual sector transceivers that are co-located at the sectored cell site. Locations of the individual sector transceivers may be estimated from location information reported by mobile devices providing GPS data from a respective transceiver. Combining the location estimates for each individual sector transceiver that is co-located at the sectored cell site will result in a substantial portion of the individual errors cancelling each other out, resulting in a better location estimate 508 for each of the individual transceivers of the sectored cell site.

The location estimates of the individual transceivers 402 are combined together to provide a location estimate of a virtual transceiver which may be used for as the location estimate of each individual transceivers of the sectored cell site.

Effectively, the co-located sector transceivers of sectored a cell site are combined in a single virtual transceiver, which can be considered as if it were an omni-directional transceiver at the cell site. The information used for estimating the location of the individual sector transceivers can be used in estimating the location of the virtual transceiver, and since the group sector transceivers may provide the coverage similar to an omni directional cell site, the users contributing location information should be evenly distributed about the virtual transceiver. It should be appreciated, that the description of the virtual transceiver is intended for explanation, and a further transceiver is not actually created. Rather the virtual transceiver is a representation for the group of sector transceivers co-located at a sectored cell site. By utilizing location reports or updates provided by mobile devices which can provide location information, such as by using their GPS receiver, an accurate location mapping of cell sites in the network can be determined, regardless of if the cell sites comprise sector transceivers or not. The refined network location mapping can then be utilized to provide location estimation from the network for devices which do not have accurate location information.

Figure 6:
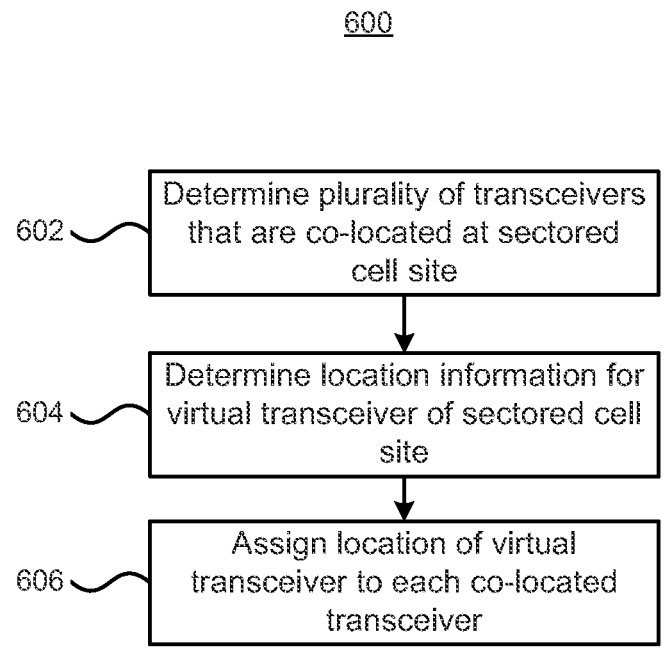
FIG. 6 depicts a method of improving a location estimate for co-located sector transceivers.

FIG. 6 depicts a method of improving a location estimate for sector transceivers co-located at sectored cell sites. The method 600 begins with determining a plurality of transceivers that are co-located (602) at a sectored cell site. Although it is possible to determine co-located transceivers as described further below, the method 600 assumes that there is an existing data store of information with information identifying which transceivers are co-located at sectored cell sites. Further it is assumed that the data store also contains location estimates of the individual transceivers. The location data may be provided by, or determined from, location reports from mobile devices having accurate location information when they see the transceivers, as described above.

Once the co-located sector transceivers are determined, the method determines a location estimate of a virtual transceiver that represents the co-located transceivers of the sectored cell site (604). The location of the virtual transceiver can be determined by averaging the location estimates of the individual transceivers of the virtual transceiver. Once the location is determined for the virtual transceiver, it is assigned to each of the individual transceivers represented by the virtual transceiver (606). Assigning the location of the virtual transceiver to the location of the individual transceivers that are determined to be co-located at the sectored cell site may be accomplished in numerous ways. For example, the virtual transceiver location could replace the existing location estimate of each transceiver. Alternatively, the virtual transceiver location could be associated with the individual transceivers of the sectored cell site in addition to the original location estimates.

Accurate mobile device location estimates can be utilized to provide estimations of locations of transceivers of each sector of a cell site. The locations of all of the sector transceivers that are co-located at sectored cell site can then be utilized to refine the location of each individual sector transceiver. The transceiver location information can then be utilized by location services to provide network location services to devices which do not have accurate location information.

Figure 7:
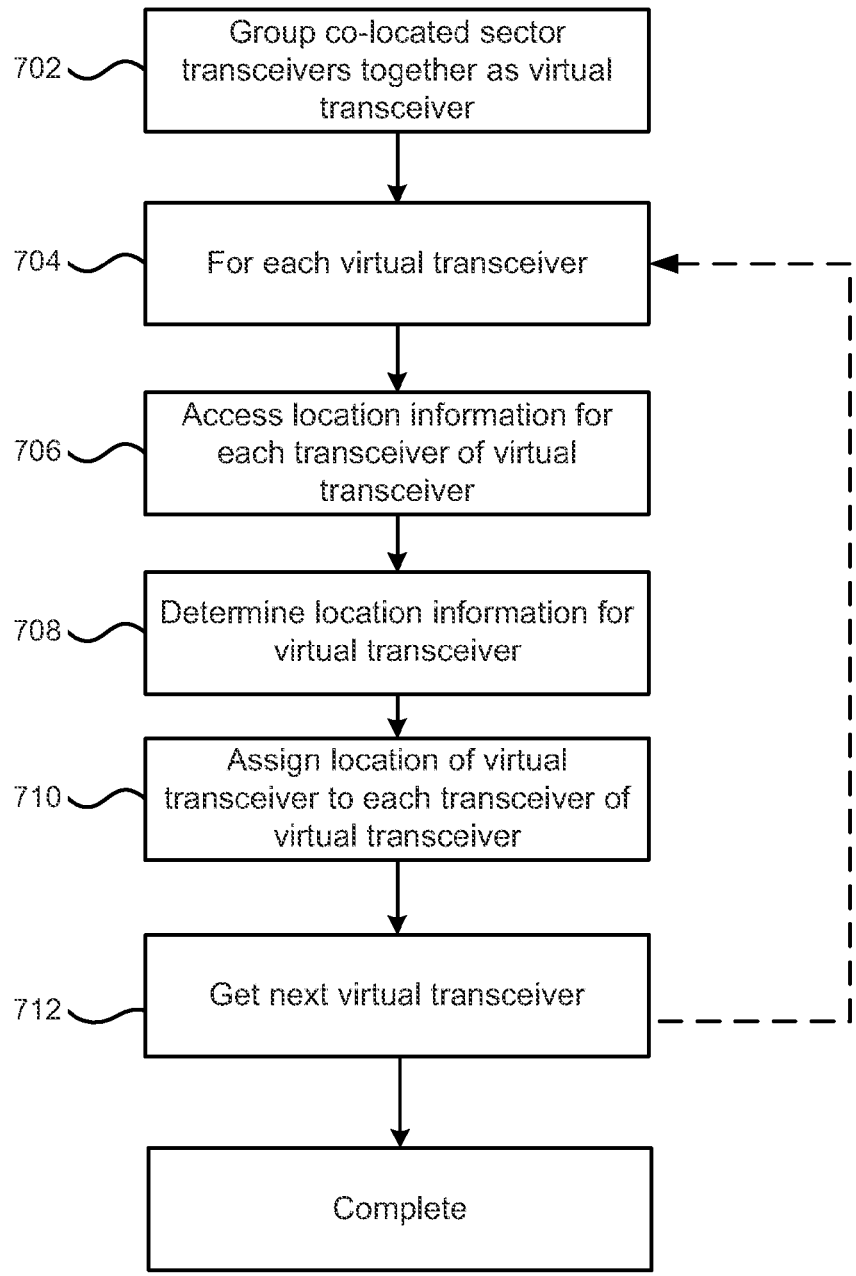
FIG. 7 depicts a further method of improving a location estimate for co-located sector transceivers.

FIG. 7 depicts a further method of improving a location estimate for transceivers that are co-located at sectored cell sites. The method 700 groups co-located sector transceivers together as one or more virtual transceivers (702). The method 700 processes each of the individual virtual transceivers (704). Although the method depicts the processing of the virtual transceivers as occurring sequentially, one after the other, it is contemplated that they could be processed in parallel. For each virtual transceiver, the method accesses location estimates for each individual transceiver of the virtual transceiver (706) and determines a location estimate for the virtual transceiver from the accessed location estimates (708). The location estimate of the virtual transceiver can be determined as a centroid of the location estimates of the individual transceivers. After the location estimate is determined for the virtual transceiver, it is assigned to each of the individual transceivers of the virtual transceiver (710). The method then returns to get another virtual transceiver (712) unless there are no more virtual transceivers, in which case the method is complete.

Figure 8:
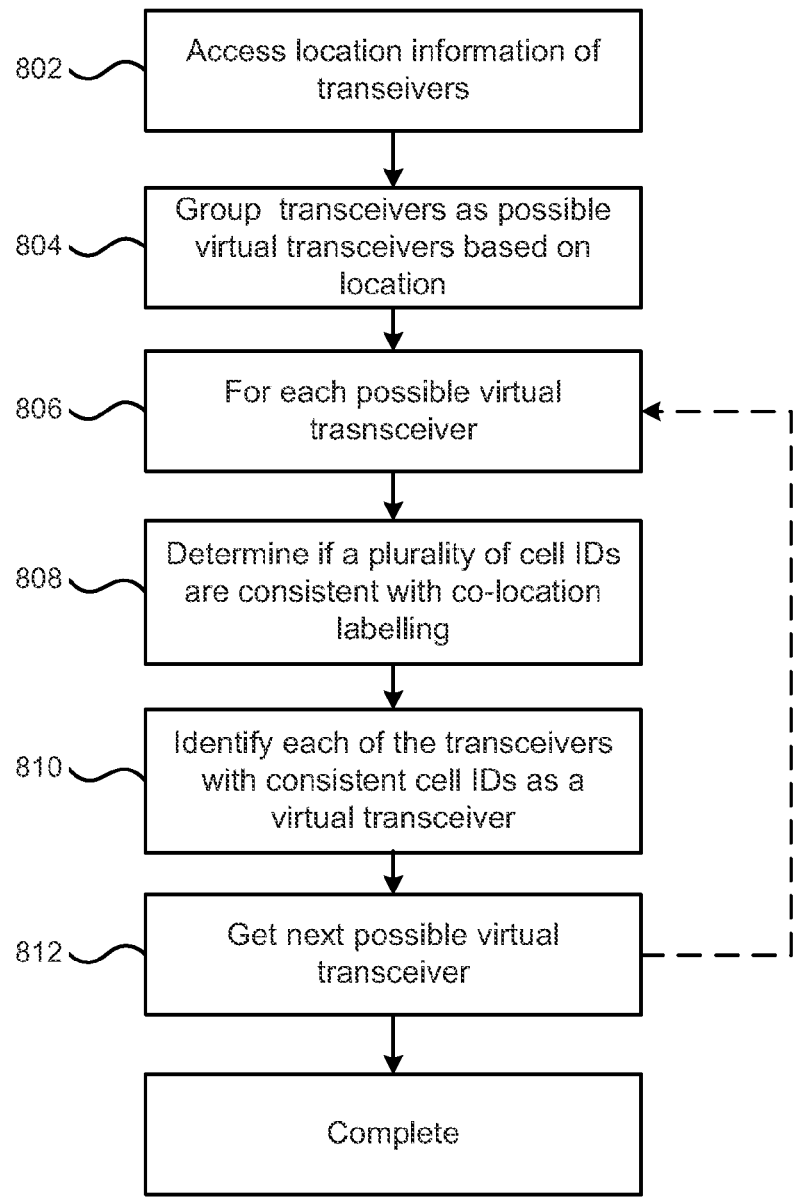
FIG. 8 depicts a method for identifying sector transceivers that are co-located at sectored cell sites.

FIG. 8 depicts a method for identifying sector transceivers that are co-located at sectored cell sites. The method 800 may be applied to a large collection of transceiver information that associates a unique transceiver ID with a location estimate of the transceiver. The method 800 accesses the location information of the transceivers (802). The transceiver information may be generated from a collection of users that provides location information of their positions, when known, which may be determined for example using GPS or as described above, as well as an indication of the transceiver visible from the location. It will be appreciated that the visible transceivers are those transceivers that the mobile device can receive signals from. The location information of the transceivers is used to group transceivers into possible virtual transceivers based on the location (804) of the transceivers. Sector transceivers that are within a certain distance of each other are grouped together as possible virtual transceivers. Since a virtual transceiver provides a representation of a plurality of sector transceivers that are co-located at a sectored cell site, they should all have the same location; however, due to the possible error in calculating their locations, as described above with reference to FIG. 4, they may only be in the same vicinity as each other. The distance used to group possible virtual transceivers together may be provided as distance threshold specifying the maximum distance that each transceiver of a sectored cell site can be from each other transceiver of the sectored cell site. The distance threshold may vary depending upon the area covered by the cell site. As an example, the distance threshold may be 500 meters, although other distances are possible, such as 50 meters or more, or less than 1000 meters. Once the transceivers are grouped into virtual transceivers based on their locations, each virtual transceiver is processed (806). Although depicted as being processed in a sequential manner, it is contemplated that the processing of the virtual transceivers could be done in parallel. For each of the virtual transceivers, the method determines which, if any, of the transceivers have IDs that are consistent with a co-location labelling format. The co-location labelling may vary on various characteristics of the network. However a co-location labelling format may be associated with one or more characteristics of the transceiver or cell site that can be determined from the location information. As such, it is possible to determine one or more co-location labelling formats to use and determine which of the transceivers match the co-location labelling format. For example, one co-location labelling format may specify that co-located transceivers have a first identifier portion that is common to a carrier's transceivers within a particular location area or cell site. Transceivers that are co-located at a sectored cell site would have this first portion in common. The co-location labelling format may specify that the co-located transceivers have a second identifier portion that uniquely identifies the individual sector transceivers within the location area or cell site. In one identification format the last digit of a cell ID may identify the type of sectorization, such as a value 0 is used for omni-directional antenna, values 1,2,3 are used to identify sectors of tri-sector or bi-sector antennas. For example, transceivers with IDs of "123 1", "123 2" and "123 3" could be considered as co-located based upon an example labelling scheme. Transceivers with IDs of "147 1", "149 0", "189 2" would not be considered co-located. Once all of the transceivers with IDs for a cell site that are consistent with the co-located labelling format are determined, they are identified as being co-located transceivers (810), which may be accomplished in various manners, including by assigning each of the identified co-located transceivers a unique virtual transceiver ID. Once a virtual transceiver is processed according to 808 and 810, the method may continue with processing further virtual transceivers (812) until all virtual transceivers have been processed, at which point the method 800 is complete.

Figure 9:
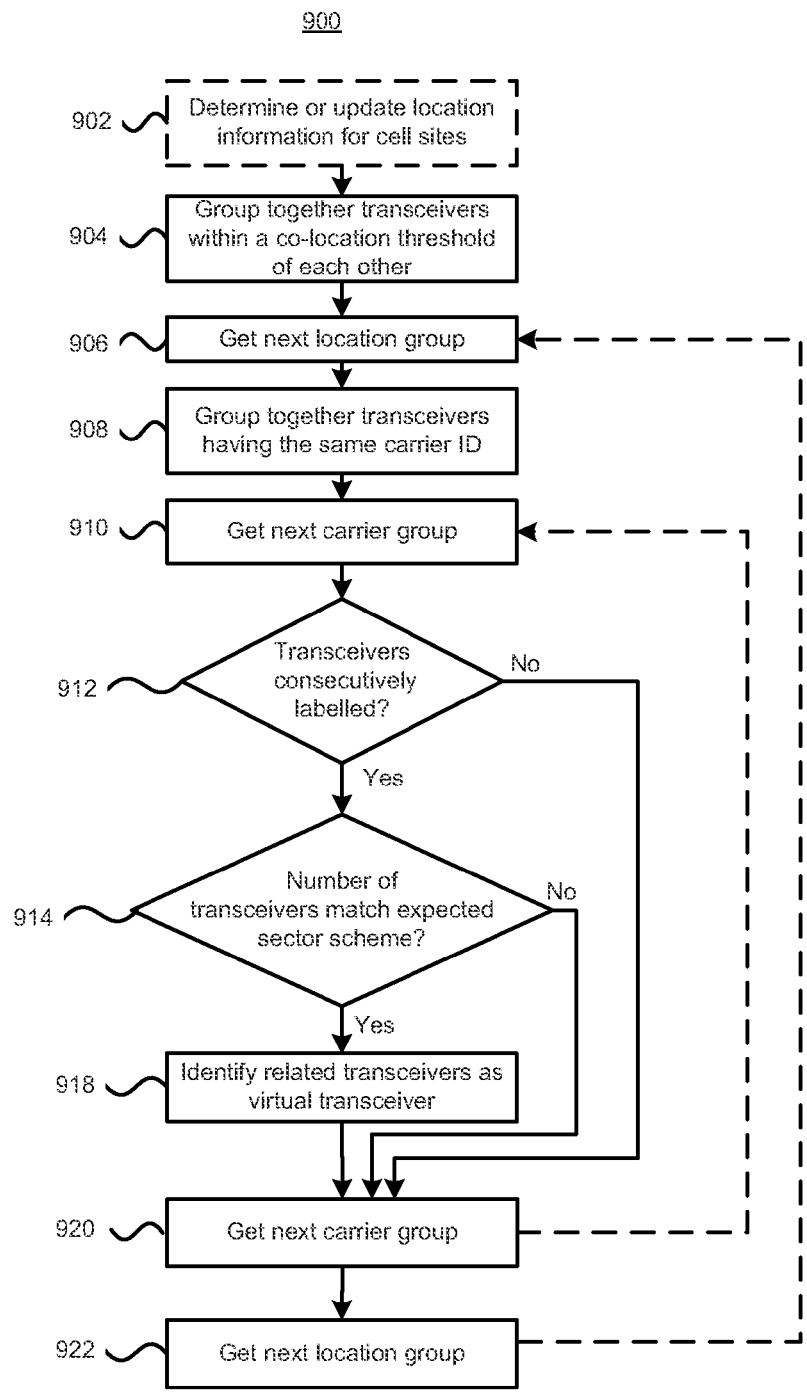
FIG. 9 depicts a further method for identifying sector transceivers that are co-located at sectored cell sites.

FIG. 9 depicts a further method for identifying sector transceivers that are co-located at sectored cell sites. The method 800 above assumed that the location information was for transceivers from a single wireless carrier, or network infrastructure provider. It is possible that the location information provides location information for transceivers of multiple different carrier networks. Sector transceivers that are co-located at a sectored cell site will be from the same carrier network. As such, a further determination of the carrier network associated with the transceiver may be used when determining if a plurality of transceivers should form virtual transceivers. Method 900 may be used to identify sector transceivers that are co-located at sectored cell sites from a collection of location information of a plurality of transceivers from a plurality of carrier networks.

The method may begin with determining or updating location information for transceivers of cell sites (902). Determining or updating a transceiver's location information may be done using radio scene observations provided by mobile device in the network that have accurate location information of their own respective position using GPS location estimation. The mobile device can report the ID which is associated with a transceiver and the position of the mobile device when the ID was detected.

Transceivers that are within a co-location threshold of each other are grouped together into location groups (904), and then each location group is processed (906). Although depicted as being processed sequentially, it is contemplated that the location groups could be processed in parallel. Each location group is processed in order to group transceivers from the location group into one or more carrier network groups (908) so that transceivers of the same carrier network are grouped together. Carrier information may be provided in the transceiver ID, or may be associated with the transceiver ID. Once the transceivers are grouped into carrier groups, each carrier group can be processed (910). Although depicted as being processed sequentially, it is contemplated that the carrier groups could be processed in parallel.

For each carrier group, the IDs of the transceivers in the carrier group checked to see if the IDs are numbered or labelled consecutively or more broadly whether the labelling conforms to a co-located labelling format. If the transceivers aren't consecutively labelled (No at 912), then the transceivers in the carrier group are not considered as co-located and processing proceeds to get the next carrier group (920). If the transceivers are consecutively labelled (Yes at 912), it is determined if the number of transceivers in the carrier group matches an expected sector scheme (914) specifying an expected number of transceivers in a sectored cell site. For example, sector cell sites commonly use 2, 3 or 6 sectors. As such, the expected sector scheme may indicate that there are 2, 3 or 6 transceivers expected for a sectored cell site. If the number of sector transceivers in the carrier group do not match the expected sector scheme (No at 914), then the transceivers in the carrier group are not considered as being co-located at a sectored cell site and processing proceeds to get the next carrier group (920) for the location group. If the number of transceivers does match the expected sector scheme (Yes at 914), the transceivers of the carrier group are identified as a virtual transceiver (918). After identifying the transceivers of the carrier group as a virtual transceiver, any further carrier groups in the location group may be processed (920), and once all of the carrier groups in the current location group have been processed, another location group can be processed (922).

Once the method has identified the virtual transceivers, the location estimates of the sectorized transceivers the virtual transceivers can be updated, for example using one of the methods 700 or 800 described above.

Figure 10:
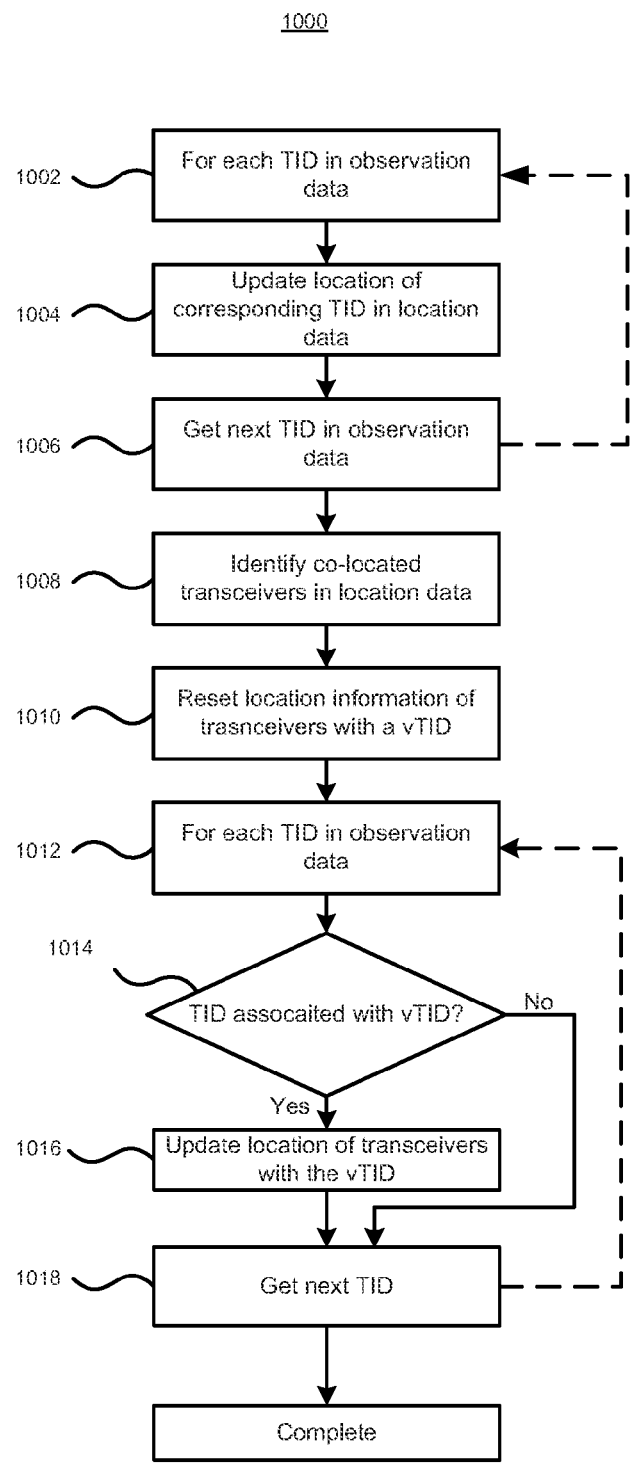
FIG. 10 depicts a method of estimating transceiver locations.

FIG. 10 depicts a method of estimating transceiver locations. The method 1000 may be used to process observation data that is provided from a plurality of mobile devices. An illustration of the observation data is provided in FIG. 11A. As depicted the observation data comprises a plurality of entries each associating a transceiver ID (TID) with location information comprising latitude and longitude information, which would correspond to the location of the user reporting the observation. It is noted that the transceiver IDs in the observation data shown in FIG. 11A are provided as an example and intended to depict co-located transceiver IDs and non co-located transceiver IDs and may not reflect actual transceiver ID formatting. Additionally, only one observation for each transceiver ID is depicted; however, in actuality there could be numerous more observations for each individual transceiver ID. Further, only the transceiver ID and location information is depicted; however, additional information may be associated with each observation, including a date and time of the observation; an error associated with the reported location; an RSSI value for the transceiver and other information as appropriate or required for the application.

In general, the method 1000 is a two-pass process. The first pass uses the observation data to estimate locations of each of the transceivers, which is used in grouping transceivers as virtual transceivers; the resultant location data after this first pass is depicted in FIG. 11B. The second pass of the observation data re-calculates the locations of the transceivers taking into account the virtual transceivers. The resultant location data after this second pass is depicted in FIG. 11C. The second pass may only process transceivers that are associated with a vTID.

Returning to FIG. 10, the method woo processes each of the TIDs in the observation data (1002). For each TID, the location of the corresponding TID in the location data is updated (1004). Updating the location may be done by taking a centroid of the location of each observation. In order to update the location information, it may be necessary to keep track of the number of observations that have contributed to the location so far. Once the location data has been updated based on the observation data with the same TID, the next TID in the observation data is processed (1006).

Once a first pass has been made through the observation data, the location information is processed to identify co-located transceivers (1008). As depicted in FIG. 11B, the sector transceivers that are co-located at a sectored cell site may be identified by a virtual transceiver ID (vTID) that is unique to the group of sector transceivers. Once the virtual transceivers are identified, the location of the virtual transceivers is determined. As described above, it is possible to determine the location of the virtual transceivers as a centroid of the locations of the individual transceivers of the virtual transceiver. Alternatively, and as set forth below, the observation data can be processed again to determine a location estimate of the virtual transceivers. The location estimates for each transceiver associated with a vTID is reset (1010). Each of the TIDs in the observation is then processed again (1012). Each TID in the observation is processed to determine if the corresponding TID is associated with a vTID in the location information (1014), and if it is not (No at 1014) the next TID in the observation data is processed (1018). If the TID is associated with a vTID (Yes at 1014), then the observed location associated with the TID is used to update the location of each of the transceivers associated with the vTID (1016). The next TID is processed (1018), or if there are no more TIDs to process in the observation data the method is complete.

As is evident in FIG. 11C, which depicts the final results of processing the observation data, the three sector transceivers that are co-located at a sectored cell each have the same latitude and longitude.

Figure 12:
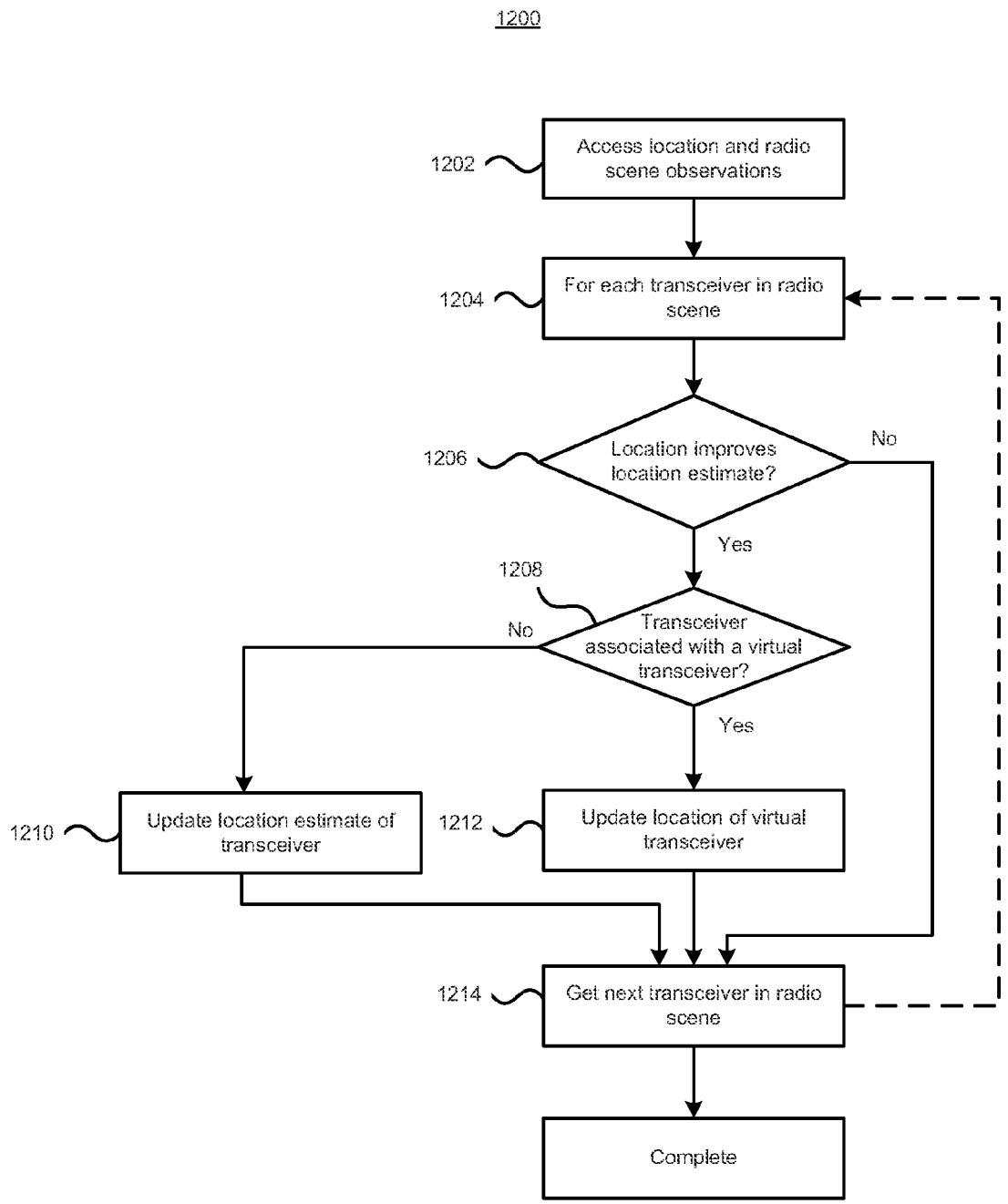
FIG. 12 depicts a method of updating a transceiver locations based on received location information.

FIG. 12 depicts a method of updating a cell site location based on received location information. The method 1200 assumes that a plurality of mobile devices provide location and radio scene information for processing. A mobile device may periodically capture a visible radio scene, which includes the transceiver IDs that are visible, and GPS location information at the time the radio scene was captured. The mobile device may provide this information as it is captured or it may store this radio scene information and provide it in batches to a central location for processing. Further, it is possible to have this functionality of submitting location and radio scene information selectively enabled or disabled by the user. The method 1200 considers processing a single location and radio scene observation.

The method 1200 access the location and radio scene observation (1202). The location may be determined at the mobile devices in numerous ways, including the methods described herein, or through the use of GPS. The radio scene identifies the transceiver IDs of the transceivers that were seen by the mobile device at the indicated location. Each transceiver in the radio scene is processed (1204). For each transceiver in the radio scene, it is determined if the location associated with the transceiver in the observation would improve the current location estimate for the transceiver (1206). For example, if the error associated with the location of the observation is greater than the error associated with the current location estimate, the observation may not improve the location estimate. If the observation does not, or would not, improve the location estimate (No at 1206), the next transceiver in the radio scene is processed (1214). If the observation does, or would, improve the location estimate (Yes at 1206), the observation is used to update the location estimate. It is determined if the transceiver ID is associated with a virtual transceiver (1208), and if it is (Yes at 1208) the location of the observation is used to updated the location estimate of the virtual transceiver (1212) and the individual transceivers of the virtual transceiver, and the next transceiver in the radio scene is processed (1214). If the cell ID is not associated with a virtual transceiver (No at 1208), the location of the observation is used to update the location estimate of the transceiver (1210). Once the location estimate is updated, the next transceiver in the radio scene is processed (1214). If there are no further transceivers in the radio scene, the method is done (1216).

Figure 13:
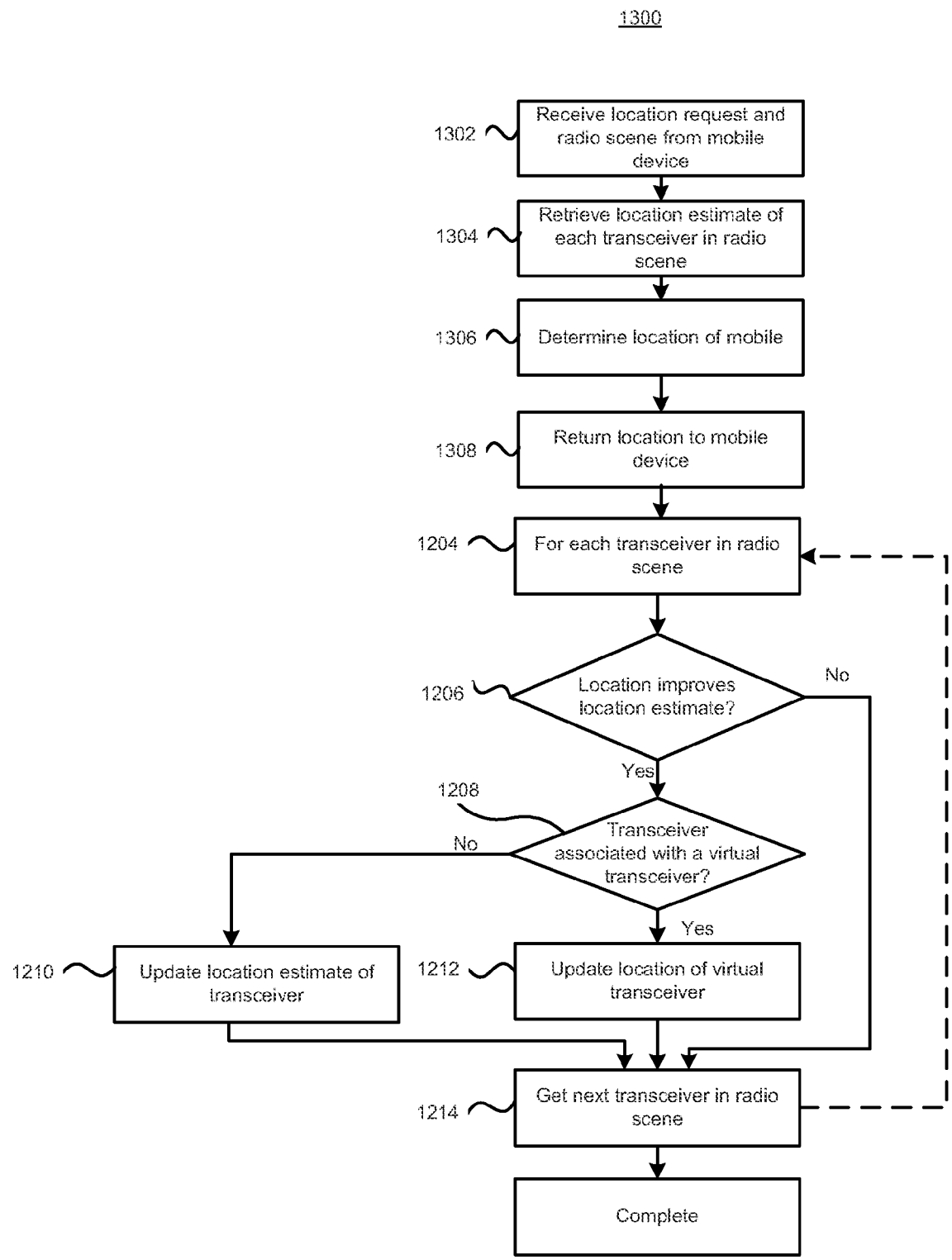
FIG. 13 depicts a method of providing a location estimate.

FIG. 13 depicts a method of providing a location estimate by a location service. The method 1300 uses of the location estimates of transceivers to determine a location of a mobile device. The method 1300 begins when a request is received from a mobile device to determine its location (1302). The location request from the mobile device comprises a radio scene identifying the transceivers visible at the mobile device as well as their associated RSSI values. The location estimate for each transceiver in the radio scene is retrieved, if available (1304). The estimate of the mobile device's location is then determined (1306), for example by n-lateration using the location estimates of the visible transceivers and the RSSI values (1306). Other techniques of determining the mobile device's location are possible, including taking a centroid of the locations of the visible transceivers. Once the location is determined, it is returned to the mobile device (1308).

Since the location request included a radio scene, and resulted in an estimate of the location associated with the radio scene, the location may be used to update location estimates of transceivers in the radio scene. Although, the location estimate of the mobile device may have a larger error than the location estimate of the individual transceivers, it is possible that the location estimate could improve the location estimate for one or more of the transceivers in the radio scene. For example, if a new transceiver is added, an initial estimate of its location can be determined.

Each transceiver in the radio scene received in the location request is processed (1310). For each transceiver in the radio scene, it is determined if the determined location for the mobile device would improve the current location estimate for the transceiver (1312). For example, if the error associated with the determined location for the mobile device is greater than the error associated with the current location estimate, the determined location may not improve the location estimate. If the determined location does not, or would not, improve the location estimate (No at 1312), the next transceiver in the radio scene is processed (1320). If the determined location does, or would, improve the location estimate (Yes at 1312), the determined location is used to update the location estimate. It is determined if the transceiver ID is associated with a virtual transceiver (1314), and if it is (Yes at 1314) the determined location is used to updated the location estimate of the virtual transceiver (1318), and the next transceiver in the radio scene is processed (1320). If the transceiver ID is not associated with a virtual transceiver (No at 1320), the determined location is used to update the location estimate of the transceiver (1316). Once the location estimate is updated, the next transceiver in the radio scene is processed (1320). If there are no further transceivers in the radio scene, the method is complete.

Figure 14:
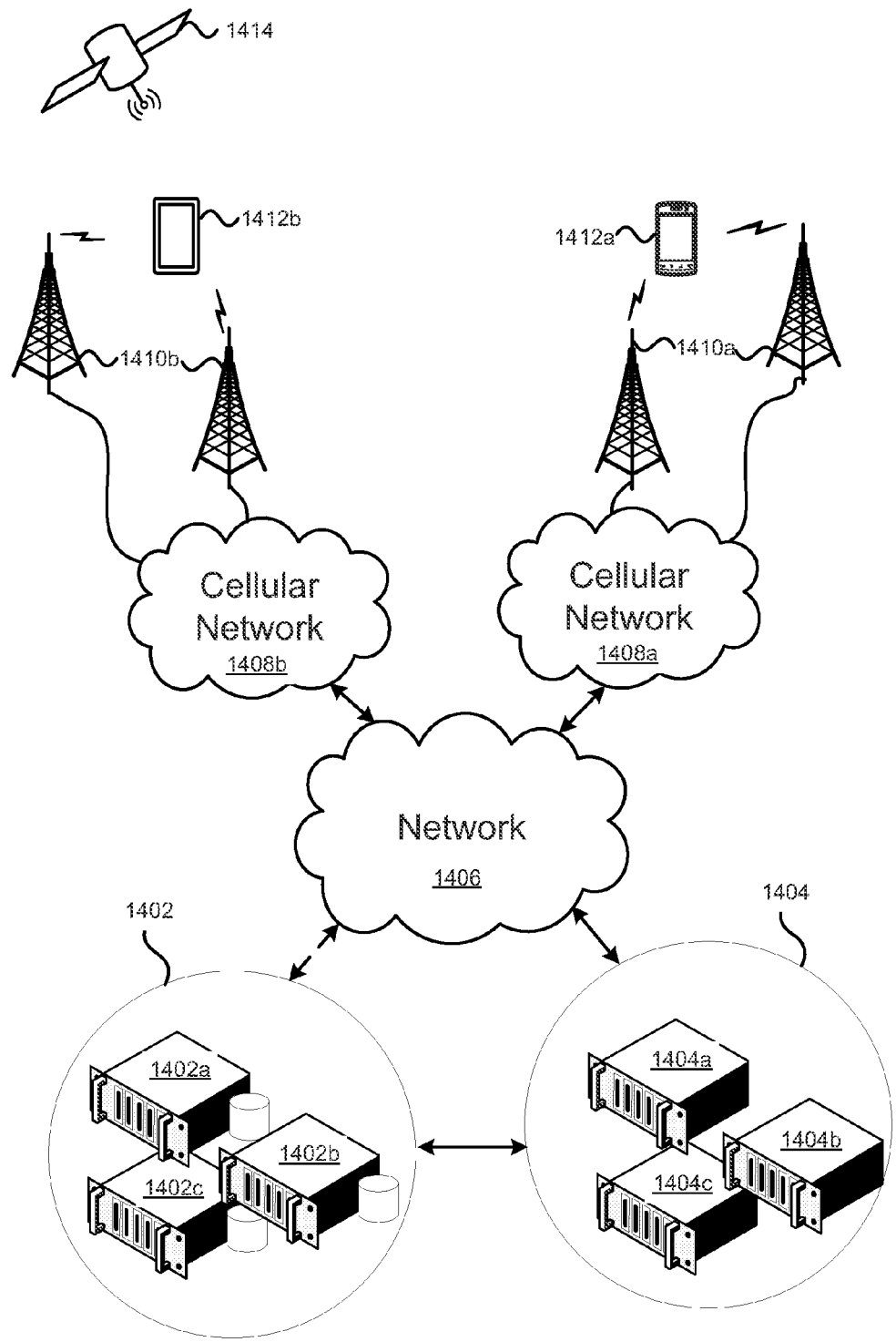
FIG. 14 depicts an environment for improving a location estimate of sector transceivers that are co-located at sectored cell sites.

FIG. 14 depicts an environment for improving a location estimate of a co-located transceiver in a sectored cell site. The environment 1400 may include a data storage system 1402 for storing observation data received from mobile devices, as well as location data providing location estimates for transceivers of cell sites. The data storage system 1402 is depicted as being provided by a cluster of individual data storage systems 1402a, 1402b, 1402c. A location service system 1404 provides a location service for determining a location of for mobile devices based upon a radio scene. The location service system may also receive and store observation data, as well as determine and store location data for transceivers. The location service system 1404 is depicted as a cluster of a plurality of individual location service systems 1404a, 1404b, and 1404c. The location service system 1404 may communicate with the data storage system 1402 on an internal network or external network 1406. The location service system 1404 is connected to the network 1406, which connects the location service system to one or more cellular networks 1408a, 1408b. Each cellular network may be a particular type of network and/or a particular carrier network. The cellular networks 1408a, 1408b are coupled to cellular transceivers 1410a, 1410 that allow the cellular networks to communicate with mobile devices 1412a, 1412b. The mobile devices 1412a, 1412b can communicate with the location service system 1404 in order to send location requests, and receive the location result, as well as to provide location observations. The mobile devices 1412a, 1412b may include GPS functionality for receiving locating signals from a plurality of GPS satellites 1414 in order to determine their location, potentially with a high degree of accuracy.

Figure 15:
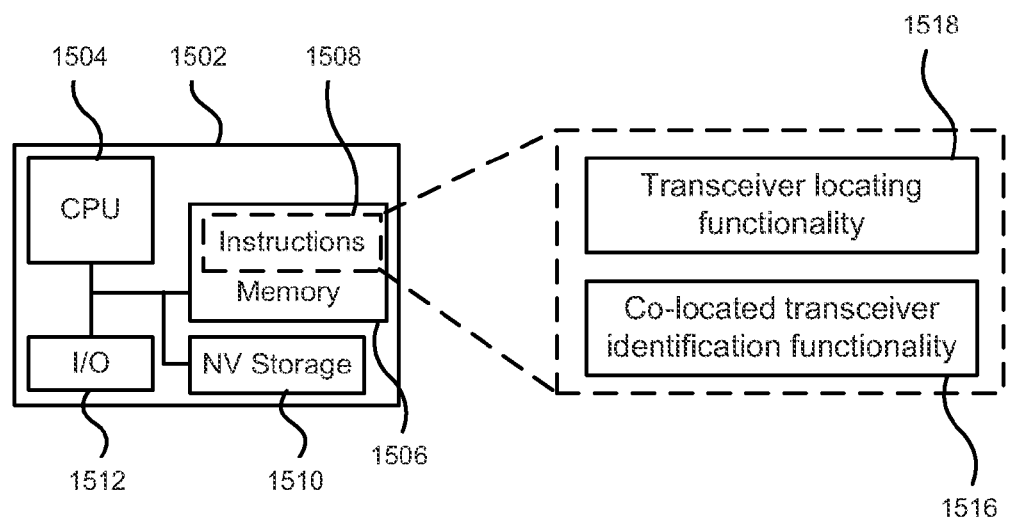
FIG. 15 depicts an apparatus for improving an estimate of sector transceivers that are co-located at sectored cell sites.

FIG. 15 depicts an apparatus for improving an estimate of a co-located transceiver in a sectored cell site. The apparatus 1500 comprises at least one processing unit 1502 for executing instructions and at least one memory unit 1504 for storing instructions 1506. The apparatus 1500 may further comprise a non-volatile storage unit 1508 as well as at least one input/output interface (I/O) 1510. The I/O interface allows data to be input into the apparatus and output from the apparatus. The instructions 1506 stored in the at least one memory unit 1504 include instructions for configuring the apparatus to provide transceiver location functionality 1512 as well as co-located transceiver identification functionality 1514 as described above.

The above has described various methods, apparatus and systems by way of examples. One skilled in the art will appreciate that the functionality described can be provided by one or more alternative embodiments based upon the current teachings.

What is claimed is:

1. A method of improving a location estimate of transceivers co-located at a sectored cell site, the method comprising:
   identifying a plurality of transceivers that are co-located at the sectored cell site comprising:
      accessing location information of a plurality of transceivers from a data store of a plurality of unique transceiver identifiers (IDs) and associated respective location estimates;
      grouping the plurality of transceiverIDs together into possible co-location groups based on the location estimates so that transceiverIDs associated with respective location estimates within a distance threshold of each other are grouped together; and
      for each possible co-located group:
         determining if the plurality of transceiverIDs of the plurality of transceivers in the possible co-located group are consistent with a co-location labelling format; and
         identifying each of the plurality of transceiverIDs with consistent transceiver IDs as co-located transceivers;
   determining a location of a virtual transceiver as an average of respective location estimates of the plurality of identified transceivers; and
   assigning the determined location of the virtual transceiver to each of the transceivers determined to be co-located.

2. The method of claim 1, further comprising accessing the respective location estimates of each of the transceivers determined to be co-located from a data store.

3. The method of claim 2, wherein the data store comprises location estimates of individual transceivers identified by respective unique identifier.

4. The method of claim 1, wherein the location estimate of each of the transceivers is determined from location information provided from a plurality of mobile devices in communication with the respective transceiver.

5. The method of claim 4, wherein the location estimate of each of the transceivers comprises a respective error resulting from determining the location as a centroid of a plurality of mobile device locations unevenly distributed about the respective transceiver.

6. The method of claim 1, wherein identifying each of the plurality of transceiverIDs as co-located transceivers comprises assigning a unique virtual transceiverID to the co-located transceivers.

7. The method of claim 1, further comprising grouping the plurality of transceivers into possible co-located groups based on a carrier associated with the transceivers.

8. The method of claim 1, further comprising, for each co-located group:
   determining a number of the plurality of transceivers with consistent transceiver IDs; and
   identifying the plurality of transceivers with consistent transceiver IDs as co-located transceivers when the number of transceivers is equal to 2, 3 or 6.

9. The method of claim 1, wherein the co-location labelling format identifies one or more labelling formats used when assigning the unique identifier to the respective transceiver.

10. An apparatus for estimating a transceiver's location comprising:
    at least one processing unit for executing instructions; and
    at least one memory unit for storing instructions, the instructions when executed by the at least one processing unit configuring the apparatus to perform a method of improving a location estimate of transceivers co-located at a sectored cell site, the executing instructions configuring the apparatus to:
       identify a plurality of transceivers that are co-located at the sectored cell site by:
          accessing location information of a plurality of transceivers from a data store of a plurality of unique transceiver identifiers and associated respective location estimates;
          grouping the plurality of transceiver together into possible co-location groups based on the location estimates so that cell IDs associated with respective location estimates within a distance threshold of each other are grouped together; and
          for each possible co-located group:
             determining if a plurality of transceiver IDs of the transceivers in the possible co-located group are consistent with a co-location labelling format; and
             identifying each of the plurality of transceiver IDs with consistent transceiver IDs as co-located transceivers;
       determine a location of a virtual transceiver as an average of respective location estimates of the plurality of identified transceivers; and
       assign the determined location of the virtual transceiver to each of the transceivers determined to be co-located.

11. The apparatus of claim 10, wherein the executed instructions further configure the apparatus to access the respective location estimates of each of the transceivers determined to be co-located from a data store.

12. The apparatus of claim 11, wherein the data store comprises location estimates of individual transceivers identified by respective unique identifier.

13. The apparatus of claim 10, wherein the location estimate of each of the transceivers is determined from location information provided from a plurality of mobile devices in communication with the respective transceiver.

14. The apparatus of claim 13, wherein the location estimate of each of the transceivers comprises a respective error resulting from determining the location as a centroid of a plurality of mobile device locations unevenly distributed about the respective transceiver.

15. The apparatus of claim 10, wherein identifying each of the plurality of transceiver IDs as co-located transceivers comprises assigning a unique virtual transceiver ID to the co-located transceivers.

16. The apparatus of claim 10, wherein the executed instructions further configure the apparatus to group the plurality of transceivers into possible co-located groups based on a carrier associated with the transceivers.

17. The apparatus of claim 10, wherein the executed instructions further configure the apparatus to, for each co-located group:
    determine the number of transceivers with consistent transceiver IDs; and
    identify the plurality of transceiver with consistent transceiver IDs as co-located transceivers when the number of transceivers is equal to 2, 3 or 6.

18. The apparatus of claim 10, wherein the co-location labelling format identifies one or more labelling formats used when assigning the unique identifier to the respective transceiver.

19. A non-transitory computer readable memory storing computer executable instructions thereon that when executed by a processor perform a method of improving a location estimate of transceivers co-located at a sectored cell site, the method comprising:
    identifying a plurality of transceivers that are co-located at the sectored cell site;
    determining a location of a virtual transceiver as an average of respective location estimates of the plurality of identified transceivers; and
    assigning the determined location of the virtual transceiver to each of the transceivers determined to be co-located,
    wherein identifying the plurality of transceivers that are co-located comprises:
       accessing location information of a plurality of transceivers from a data store of a plurality of unique transceiver identifiers (IDs) and associated respective location estimates;
       grouping the plurality of transceiverIDs together into possible co-location groups based on the location estimates so that transceiverIDs associated with respective location estimates within a distance threshold of each other are grouped together; and
       for each possible co-located group:
          determining if the plurality of transceiverIDs of the plurality of transceivers in the possible co-located group are consistent with a co-location labelling format; and
          identifying each of the plurality of transceiverIDs with consistent transceiver IDs as co-located transceivers.

* * * * *